L. M. NELSON.
TIRE.
APPLICATION FILED DEC. 29, 1909.
968,069.
Patented Aug. 23, 1910.
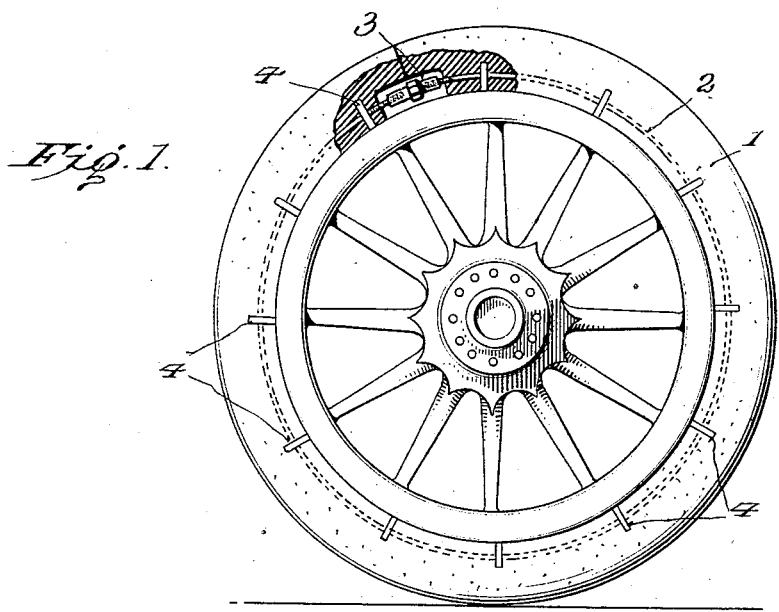
Fig. 1.
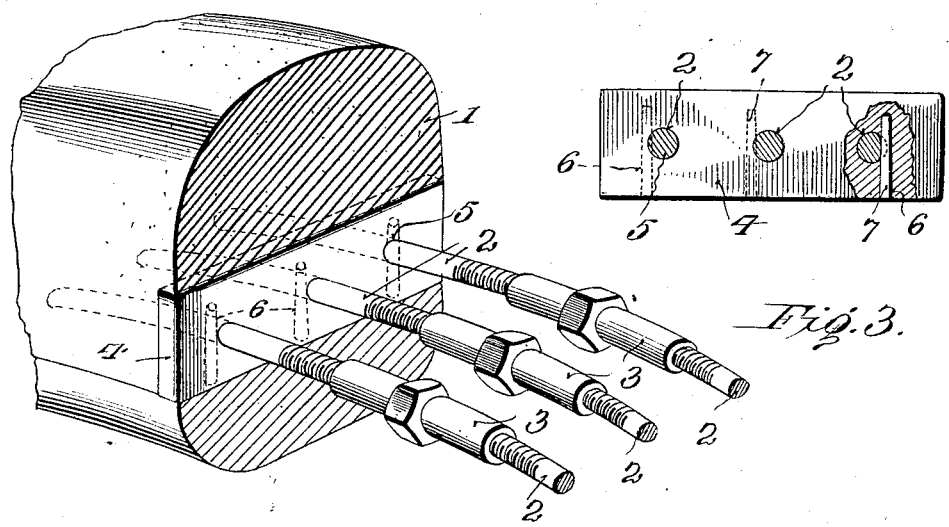
Fig. 2.
Fig. 3.
Witnesses
Inventor
L. M. Nelson
By, Attorney

UNITED STATES PATENT OFFICE.

LOUIS M. NELSON, OF PENNINGTON, NEW JERSEY, ASSIGNOR TO NELSON TIRE COMPANY, A CORPORATION OF WYOMING.

TIRE.

968,069.  Specification of Letters Patent. Patented Aug. 23, 1910.

Application filed December 29, 1909. Serial No. 535,422.

*To all whom it may concern:*

Be it known that I, LOUIS M. NELSON, citizen of the United States, residing at Pennington, in the county of Mercer and State of New Jersey, have invented certain new and useful Improvements in Tires, of which the following is a specification.

This invention comprehends certain new and useful improvements in resilient wheels and tires, and relates particularly to tires of the solid or cushion type.

The invention has for its primary object an improved tire in which is embodied means for controlling the action of the wave in the base of the tire which is caused by the pressure on the road surface, it being well known that this wave has a tendency to cause the tire to creep on the rim of the wheel in the direction opposite to that in which the wheel is rotating on the road surface, and also has a tendency to move the internal rods or binding elements in an opposite direction to the creeping of the tire.

With this and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a side elevation of a wheel equipped with a tire constructed in accordance with my invention, a portion of the tire being broken out; Fig. 2 is an enlarged sectional perspective view of a portion of the tire; and, Fig. 3 is a detail view of one of the cross bars, partially broken away.

Corresponding and like parts are referred to in the following description and indicated in all the views of the drawings by the same reference characters.

Referring to the drawing, the numeral 1 designates the body portion of my improved tire which may be of any desired construction, type or design so far as the present invention is concerned.

2 designates circumferentially extending tie rods or binding elements which may be of any desired number and which in the present instance are three in number, as shown, side by side, with spaces between. These wires or binding elements 2 are embedded in the body portion of the tire at a predetermined distance from the base thereof, and are secured together and tensioned in any desired way, as by the turn buckles 3. Also embedded in the body portion of the tire are any desired number of cross bars 4 of some relatively rigid material or substance, said cross bars being arranged at any desired intervals apart around the tire and preferably lying with their inner edges flush (or nearly flush) with the base surface of the body portion 1. The cross bars 4 are formed with transversely extending apertures 5 extending therethrough and through which the binding elements 2 are passed. The cross bars are also formed with socket 6 which extend radially (the wheel and tire being considered) from the inner edges of the cross bars toward, but preferably stopping short of the outer edges thereof. It is to be particularly noted that the sockets 6 slightly intersect the apertures 5, keys 7 being driven into said sockets so as to securely engage the binding elements 2. It is to be noted that the cross bars 4 and keys 7 are not positively connected to the rim of the wheel on which my improved tire is mounted, but merely form component parts of the tire structure.

From the foregoing description in connection with the accompanying drawings, it is manifest that the provision of the cross bars 4 and keys 7 which securely fasten the cross bars 4 to the binding element 2, will control the action of the wave in the base of the tire caused by the pressure on the road surface and will effectually prevent the creeping of the tire and also keep the rods from moving in the tire and cutting the tire up.

It is to be understood that my invention is not limited to any particular form of rim, or to any particular means for connecting together the ends of the binding wires for the elements 2, or for holding the tire on a wheel rim of an automobile truck or other vehicle and that various changes may be made in the construction, arrangement and proportions of the parts hereinbefore described without departing from the scope of the invention as defined in the appended claims.

Having thus described the invention, what is claimed as new is:

1. A tire having incorporated therein, circumferentially spaced rigid cross bars, tensioning means passing circumferentially through the series of cross bars and keys mounted in said cross bars and engaging the tensioning means to rigidly connect the latter and the cross bars, the keys being entirely embedded in the tire.

2. The herein described tire, having incorporated therein a plurality of cross bars, said cross bars being formed with apertures extending therethrough and with sockets intersecting said apertures, binding elements passing through said apertures, and keys mounted in said sockets and engaging the binding elements.

3. The herein described tire having incorporated therein a plurality of cross bars, said cross bars being formed with apertures and with radially extending sockets opening at the inner edges of the cross bars and intersecting said apertures, binding elements passing through said apertures, and keys driven into said sockets and engaging said binding elements.

In testimony whereof I affix my signature in presence of two witnesses.

LOUIS M. NELSON. [L. S.]

Witnesses:
CELIA SCARBOROUGH,
J. C. BUNN.